(12) United States Patent
Yoon et al.

(10) Patent No.: US 12,339,461 B2
(45) Date of Patent: *Jun. 24, 2025

(54) OPTICAL LENS ASSEMBLY FOR NEAR-EYE DISPLAY AND NEAR-EYE DISPLAY DEVICE

(71) Applicant: Tencent America LLC, Palo Alto, CA (US)

(72) Inventors: Youngshik Yoon, Cupertino, CA (US); Yi Zhang, Palo Alto, CA (US); Hongdong Li, Palo Alto, CA (US); John D. Le, Palo Alto, CA (US); Kun Gao, Palo Alto, CA (US); Hao Zheng, Palo Alto, CA (US); Jianru Shi, Palo Alto, CA (US)

(73) Assignee: Tencent America LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/619,504

(22) Filed: Mar. 28, 2024

(65) Prior Publication Data

US 2024/0418993 A1 Dec. 19, 2024

Related U.S. Application Data

(63) Continuation of application No. 18/336,014, filed on Jun. 15, 2023, now Pat. No. 12,001,025.

(51) Int. Cl.
*G02B 27/01* (2006.01)
*G02B 5/30* (2006.01)
*G02B 27/09* (2006.01)
*G02B 27/28* (2006.01)
*G02B 27/42* (2006.01)

(52) U.S. Cl.
CPC ....... *G02B 27/0172* (2013.01); *G02B 5/3083* (2013.01); *G02B 27/0955* (2013.01); *G02B 27/283* (2013.01); *G02B 27/4211* (2013.01)

(58) Field of Classification Search
CPC ............ G02B 27/0172; G02B 27/0955; G02B 27/283; G02B 27/4211; G02B 4/3083
See application file for complete search history.

(56) References Cited

U.S. PATENT DOCUMENTS

| 6,340,114 B1 * | 1/2002 | Correa ............... G06K 7/10811 |
| | | 235/462.01 |
| 2015/0378074 A1 | 12/2015 | Kollin et al. |
| 2016/0363770 A1 | 12/2016 | Kim et al. |
| 2017/0227770 A1 | 8/2017 | Carollo et al. |
| 2017/0227777 A1 | 8/2017 | Carollo et al. |
| 2018/0107000 A1 | 4/2018 | Sung et al. |

(Continued)

*Primary Examiner* — Kenneth Bukowski
(74) *Attorney, Agent, or Firm* — ANOVA LAW GROUP, PLLC

(57) ABSTRACT

An optical lens assembly for a near-eye display device includes a light box and a diffractive optical element (DOE). The light box has a first layer facing a display screen of the near-eye display device and a second layer facing the DOE. The light box is configured to receive a first light from a display screen of the near-eye display device and transmit at least a portion of the first light to the DOE through a folded optical path, where the first layer and the second layer are flat. The DOE aligned with an optical axis of an eye and is configured to receive a second light from the light box and converge the second light to the eye.

20 Claims, 4 Drawing Sheets

(56) References Cited

U.S. PATENT DOCUMENTS

| | | |
|---|---|---|
| 2018/0120579 A1 | 5/2018 | Gollier et al. |
| 2018/0239146 A1 | 8/2018 | Bierhuizen et al. |
| 2019/0243147 A1 | 8/2019 | Smithwick et al. |
| 2021/0271082 A1 | 9/2021 | Smith et al. |
| 2023/0204949 A1 | 6/2023 | Wheelwright |
| 2023/0236396 A1 | 7/2023 | Hudman et al. |

* cited by examiner

OPTICAL LENS ASSEMBLY FOR NEAR-EYE DISPLAY AND NEAR-EYE DISPLAY DEVICE

CROSS-REFERENCE TO RELATED APPLICATION

This application is a continuation application of application Ser. No. 18/336,014, filed on Jun. 15, 2023, the content of which is hereby incorporated by reference in its entirety.

FIELD OF THE TECHNOLOGY

This application relates to the field of near eye display technologies and, specifically, to an optical lens assembly for near-eye display and a near-eye display device.

BACKGROUND

Nowadays, near eye display (NED) becomes much more popular. There is a need to develop NED devices with compact structures, high performance, and low cost. In addition, there is also a need to control artifacts in NED devices such as pupil swim or distortion behavior.

The disclosed methods and systems are directed to solve one or more problems set forth above and other problems.

SUMMARY

One aspect of the present disclosure provides an optical lens assembly for a near-eye display device. The optical lens assembly includes a light box and a diffractive optical element (DOE). The light box has a first layer facing a display screen of the near-eye display device and a second layer facing the DOE. The light box is configured to receive a first light from a display screen of the near-eye display device and transmit at least a portion of the first light to the DOE through a folded optical path, where the first layer and the second layer are flat. The DOE aligned with an optical axis of an eye and is configured to receive a second light from the light box and converge the second light to the eye.

Another aspect of the present disclosure provides a near-eye display device including a display screen configured to emit a first light to an optical lens assembly, and the optical lens assembly. The optical lens assembly includes a light box and a diffractive optical element (DOE). The light box has a first layer facing the display screen and a second layer facing the DOE. The light box is configured to receive a first light from a display screen of the near-eye display device and transmit at least a portion of the first light to the DOE through a folded optical path, where the first layer and the second layer are flat. The DOE aligned with an optical axis of an eye and is configured to receive a second light from the light box and converge the second light to the eye.

Other aspects of the present disclosure can be understood by those skilled in the art in light of the description, the claims, and the drawings of the present disclosure.

DETAILED DESCRIPTION

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure.

The present disclosure provides an optical lens assembly for a near-eye display (NED) device. The NED device may be a virtual reality (VR) device such as a VR headset, an augmented reality device such as an AR glass, and/or any other suitable display device. The optical lens assembly of the NED device may include a light box that provides an optical path folding function and a diffractive optical element (DOE) that provides an imaging focusing function. With optical path folding, the structure of the NED device can be more compact. In some embodiments, the functions of the light box and the DOE do not overlap (e.g., the optical path function is only provided by the light box but not the DOE), thereby providing more freedom in structure design and increasing manufacturing and assembly yields.

Figure 1:
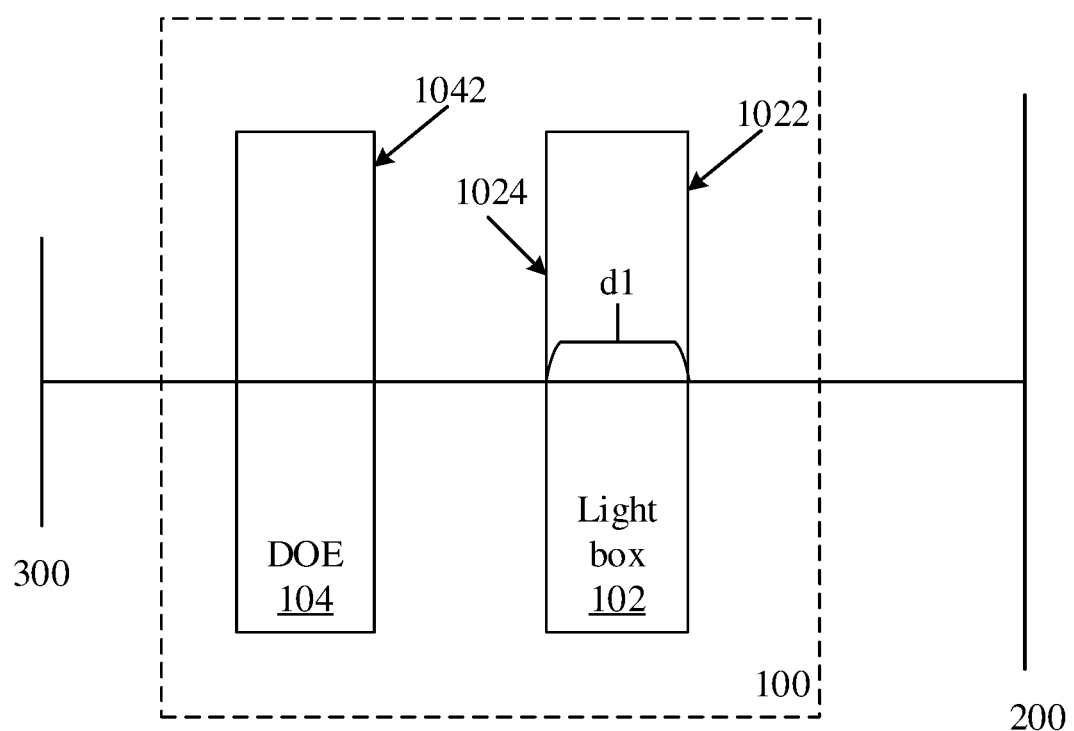
FIG. 1 illustrates an example near eye display (NED) device consistent with certain embodiments of the present disclosure.

FIG. 1 illustrates an example near eye display (NED) device consistent with certain embodiments of the present disclosure. As shown in FIG. 1, the NED device may include an optical lens assembly 100 and a display screen 200. The display screen 200 may be a light-emitting system configured to emit light to the optical lens assembly 100. The emitted light correspond to image pixels output by a processor coupled to the NED device for a user to view.

The optical lens assembly 100 includes a light box 102 and a DOE 104. The light box 102 is configured to receive a first light from the display screen 200 and transmit at least a portion of the first light to the DOE 104 through a folded optical path. The DOE 104 is configured to receive a second light from the light box 102 and converge the second light to the eye.

The light box 102 includes a first layer 1022 facing the display screen and a second layer 1024 facing the DOE 104. The optical path folding function of the light box 102 can be achieved by reflective surfaces of the two layers. The reflective surfaces may include one or more of: reflective polarizer(s), beam splitter(s), etc. Other optical element may also be used in the two layers of the light box 102, such as waveplate(s)/retarder(s), lens(es), filter(s), diffractive element(s), etc. In some embodiments, the first layer 1022 and the second layer 1024 are parallel and both have flat surfaces. That is, the light box 102 itself may not contribute to converging/focusing the light from the display screen 200 to the eye 300, but just fold the optical path and provide a compact form factor for the NED device.

In some embodiments, a medium can be filled to the light box 102 in between the first layer 1022 and the second layer 1024. The medium may be solid (e.g., glass or plastic), liquid, and/or gas (e.g., air or other types of gas). In one embodiment, a volume of the medium filled in the light box 102 can be adjusted based on an eye sight of a user. For example, the volume of the medium filled in the light box 102 can be increased to provide a shortened optical path if the user is far-sighted, or decreased to provide an extended optical path if the user is near-sighted. In another embodiment, a distance d1 between the first layer 1022 and the second layer 1024 may be adjusted based on an eye sight of a user. For example, by moving the first layer 1022 and/or the second layer 1024 to be closer or further apart, the distance d1 can be decreased to provide a shortened optical path if the user is far-sighted, or increased to provide an extended optical path if the user is near-sighted. In some embodiments, the distance adjustment may be achieved manually through a mechanical mechanism coupled to the light box or automatically using an electromechanical part coupled to the light box in response to a control signal generated by the NED device. In some embodiments, different light box models adapted to different eye sights can be manufactured and a user can select a light box model matching their eye sight to be installed in the NED device.

In some embodiments, the first layer 1022 may include a beam splitter facing the display screen 200 and a first retarder facing the second layer 1024, and the second layer 1024 may include a reflective polarizer configured to reflect a light with a first polarization characteristics and allow a light with a second polarization characteristics to transmit through.

An optical axis of the DOE 104 and the eye 300 may be aligned. The optical axis of the DOE 104 can be perpendicular to the first layer 1022 and the second layer 1024. In some embodiments, unlike pancake lens design in related art, an optical path of a light from the display screen 200 to the eye 300 in an example embodiment disclosed herein does not fold in a space between the DOE 104 and the light box 102. In some embodiments, the DOE 104 itself does not fold the optical path. In some embodiments, the DOE 104 does not provide reflective function and/or polarization function to an incoming light, thereby giving more flexibility in determining a material, type, curvature, and/or shape of the DOE. In some embodiments, surface(s) of the DOE 104 is not flat. For example, the surface 1042 of the DOE 104 facing the light box 102 is not flat and can be curved and/or have a surface like a Fresnel lens. The other surface of the DOE 104 facing the eye may also be curved. In some embodiments, the DOE 104 can include at least one of an injection molded DOE, a hologram film, or a Fresnel lens surface. The DOE 104 (e.g., with curved surface(s) and no polarizer) can also contribute to chromatic aberration correction. As a result, when the optical lens assembly 100 is applied in an AR device with a see-through camera, it can provide a better sync up with the see-through camera with no additional image tuning or process, where distortion control is achieved easily (based on flat surface light box and DOE) and lateral color is well corrected.

In an example embodiment of the disclosed optical lens assembly 100, individual components (i.e., the light box 102 and the DOE 104) may each have a designated function that does not overlap. In other words, only one component of the optical lens assembly 100 (e.g., light box 102) provides an optical path folding function, and only one component of the optical lens assembly 100 (e.g., DOE 104) provides an imaging/focusing function. In this way, compared with a pancake lens design in related art where at least two lenses are involved in both optical path folding and light focusing, manufacturing and assembly yields can be improved since alignment of the at least two lenses are critical in the related art whereas an alignment between the DOE 104 and the light box 102 is more flexible as the two components does not share focusing function. Further, with flat surfaces of the light box 12, lamination is easy without damaging its optical performance, and the disclosed optical lens assembly 100 is less sensitive to quality degradation factors such as tilt of lens and/or tilt of light source. This can also bring a more user friendly experience since the NED device has higher tolerance to accidental drops and other external forces. Moreover, additional optical components can be easily added to the optical lens assembly 100 with less technical difficulty (e.g., without consideration on optical power of the light box). Furthermore, the focus system in the related art is fixed whereas the disclosed optical lens assembly 100 can provide focus adjustment based on a user's eye sight.

Figure 2:
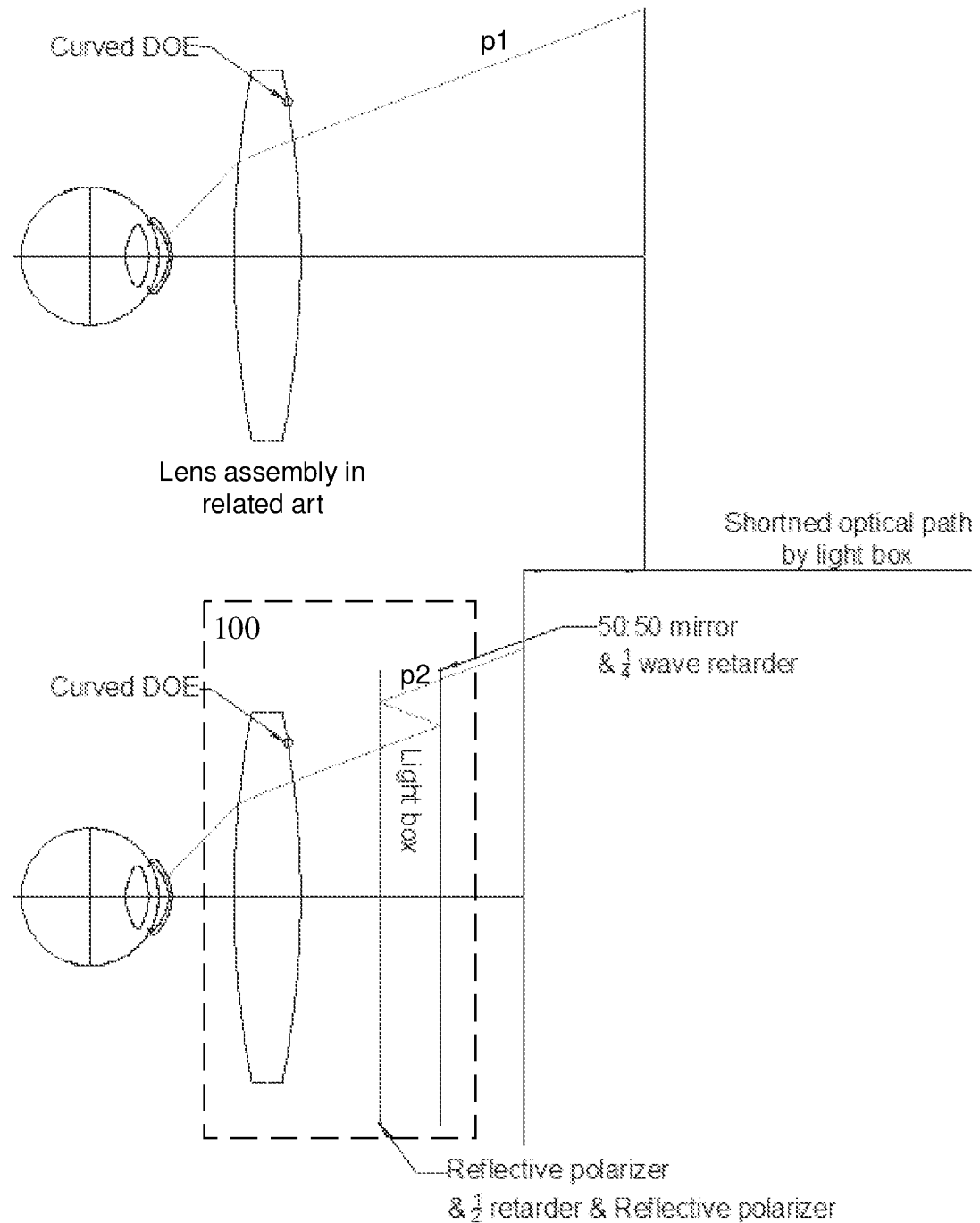
FIG. 2 illustrates a comparison between an NED device with unfolded optical path in related art and an example NED device with folded optical patch consistent with certain embodiments of the present disclosure.

FIG. 2 illustrates a comparison between an NED device with unfolded optical path in related art and an example NED device with folded optical path consistent with certain embodiments of the present disclosure. As shown in FIG. 2, an optical path p1 of a lens assembly between a display screen and an eye in related art (shown on top of FIG. 2) goes directly through the curved DOE and is not folded, while an optical path p2 of an optical lens assembly 100 between a display screen and an eye (shown on bottom of FIG. 2) based on an example embodiment of the present disclosure is folded. In this way, a physical distance requirement between the display screen and the eye is shortened and a compact form factor is provided to the NED device, thereby reducing a physical size the NED device.

The bottom of FIG. 2 further illustrates an example structure of the disclosed optical lens assembly 100. As shown in FIG. 2, the first layer 1022 of the light box 102 includes a 50/50 beam splitter and a quarter-wave retarder, and the second layer 1024 includes at least a first reflective polarizer facing the first layer 1022.

Figure 4:
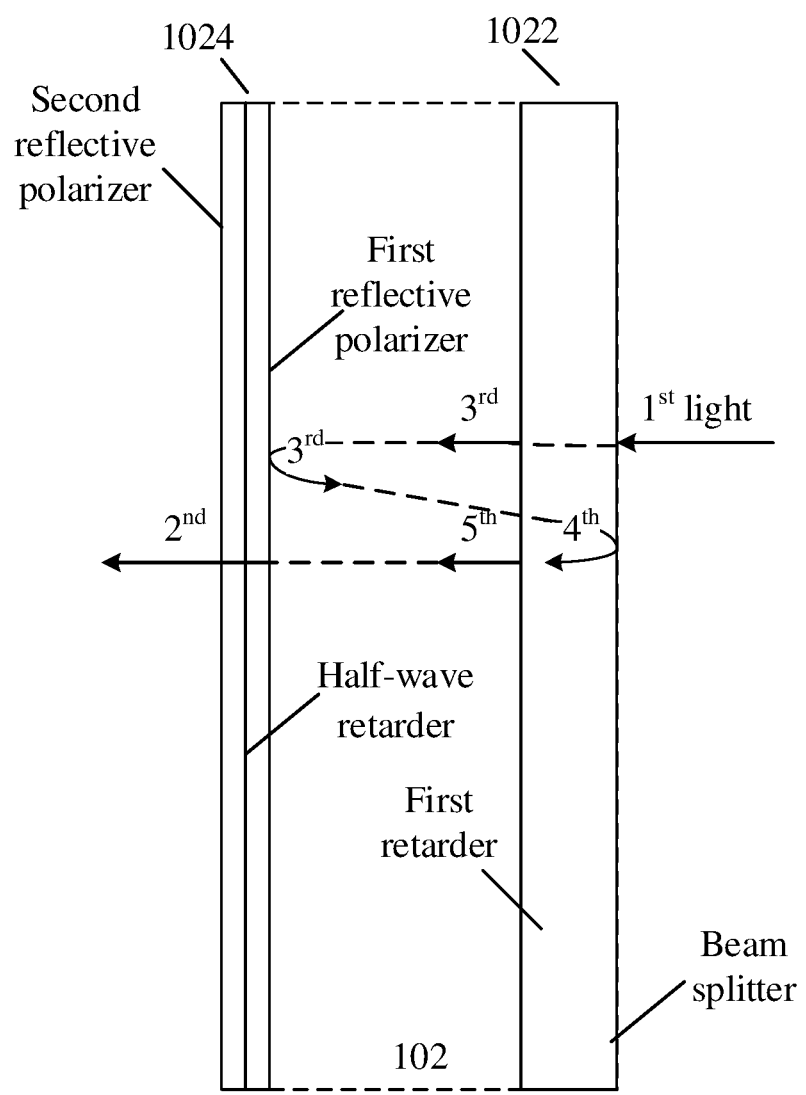
FIG. 4 illustrates another example near eye display (NED) device consistent with certain embodiments of the present disclosure.

In some embodiments, as shown in FIG. 4, the light from the display screen can have a circular polarization of a first rotation direction (e.g., left-handed circular polarization). The 50/50 beam splitter is configured to receive the first light, reflect 50% of the first light back, and let 50% of the first light transmit through and reach the quarter-wave retarder in the first layer 1022. The quarter-wave retarder is configured to change the 50% of the first light to a third light having a first linear polarization. The third light passes through the medium filled in the light box 102 and reaches the first reflective polarizer at the second layer 1024. The first reflective polarizer is configured to reflect the third light back to the quarter-wave retarder. The quarter-wave retarder is further configured to change the third light having the first linear polarization to a fourth light having the circular polarization of the first direction. As the fourth light reaches the 50/50 beam splitter, the 50/50 beam splitter is further configured to reflect 50% of the fourth light back to the quarter-wave retarder and changing the circular polarization to a rotation second direction (e.g., right-handed circular polarization). The quarter-wave retarder is further configured to change the reflected light to a fifth light having a second linear polarization, the second linear polarization being orthogonal to the first linear polarization. The first reflective polarizer is configured to allow the fifth light to transmit through itself.

In one embodiment, the second layer 1024 of the light box 102 may include just one reflective polarizer. In another embodiment, the second layer 1024 of the light box may include multiple reflective polarizers. The additional reflective polarizer(s) can increase contrast and reduce noise (e.g., stray light, ghost imaging) of the optical system.

In the example shown in the bottom of FIG. 2, the second layer 1024 includes the first reflective polarizer, a second reflective polarizer, and a half-wave retarder placed in between the first reflective polarizer and the second reflective polarizer. The polarization selectivity of the first reflective polarizer is orthogonal to a polarization selectivity of the second reflective polarizer. When the fifth light transmits through the first reflective polarizer and reaches half-wave retarder, its polarization characteristics is changed to the first linear polarization. The second reflective polarizer allow the light with the first linear polarization to pass through. In another embodiment, the second layer 1024 may not include the half-wave retarder, and the polarization selectivity of the first reflective polarizer does not have to be orthogonal to the polarization selectivity of the second reflective polarizer.

Figure 3:
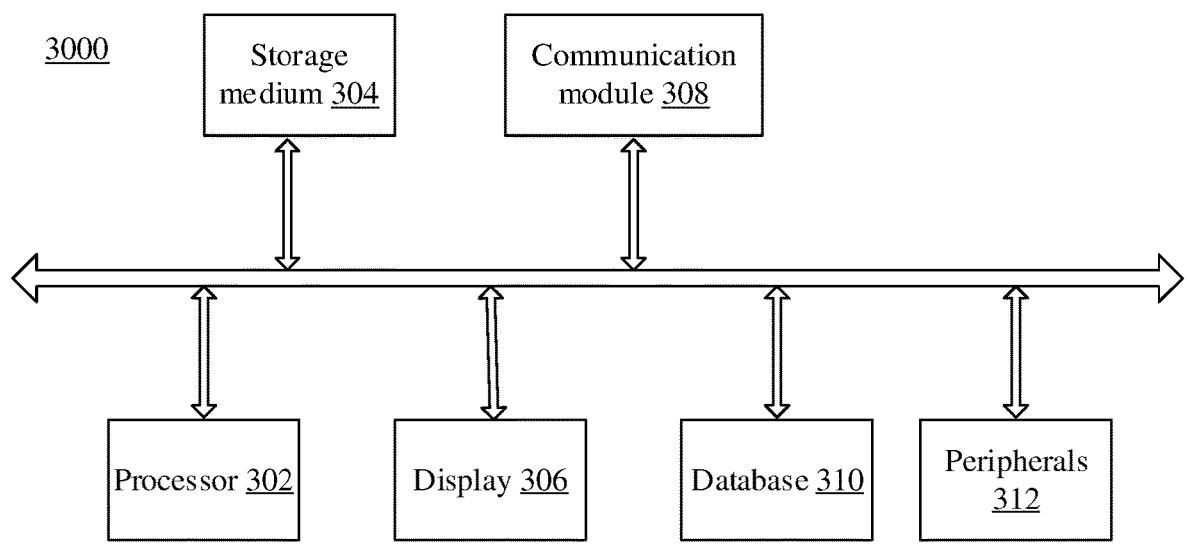
FIG. 3 illustrates a computer system consistent with embodiments of the present disclosure.

FIG. 3 illustrates a computer system capable of implementing the disclosed near-eye display system/device according to some embodiments of the present disclosure. As shown in FIG. 3, the system 3000 includes at least one processor 302 and a storage medium 304. The system 3000 also include a display 306 configured to display content to a user wearing the near eye display device, a communication module 308, and one or more bus to couple the devices together. The display 306 may include the display screen 200 and the optical lens assembly 100 shown in FIG. 1. Certain devices may be omitted and other devices may be included.

The system 3000 may be a head-mounted display (HMD), such as virtual reality (VR) glasses, augmented reality (AR) glasses, and extended reality (XR) glasses. The content displayed at the display 306 may include text, images, and/or videos. The display screen 200 may emit lights corresponding to image pixels of the display content. The image pixels of the display content may be pre-distorted by the system 3000 (e.g., the processor 302 and/or the display 306) to accommodate a near eye display scenario such as in accordance with eye movement. In some embodiments, the image pixels can be adjusted to sync up with a see-through camera of an AR device. In some embodiments, spectrum manipulation can be performed where brightness of individual color can be increased/decreased on the display screen 200, which can benefit color deficient users to perceive a full color.

The processor 302 may include one or more of any appropriate processor(s). In certain embodiments, the processor 302 may include multiple cores for multi-thread or parallel processing, and/or graphics processing unit (GPU). The processor 302 may execute sequences of computer program instructions to perform various processes, such as a display control program, etc. The storage medium 304 may be a non-transitory computer-readable storage medium, and may include memory modules, such as ROM, RAM, flash memory modules, and erasable and rewritable memory, and mass storages, such as CD-ROM, U-disk, and hard disk, etc. The storage medium 304 may store computer programs for implementing various processes, when executed by the processor 302. The storage medium 304 may also include one or more databases for storing certain data such as text script, library data, display configuration data, and certain operations can be performed on the stored data, such as database searching and data retrieving.

The communication module 308 may include network devices for establishing connections through a network. The peripherals 312 may include additional I/O devices, such as a controller, a keyboard, a speaker, and so on.

In operation, the processor 302 may be configured to execute instructions stored on the storage medium 304 and perform various operations such as processing image contents and sending image contents to the display 306 for display.

The sequence numbers of the foregoing embodiments of the present disclosure are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of the present disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of steps of the methods in the embodiments of the present disclosure.

In the foregoing embodiments of the present disclosure, descriptions of the embodiments have different emphases. As for parts that are not described in detail in one embodiment, reference can be made to the relevant descriptions of the other embodiments.

In the several embodiments provided in the present disclosure, it is to be understood that the disclosed client can be implemented in other manners. The apparatus embodiments described above are merely exemplary. For example, the division of the units is merely the division of logic functions and can use other division manners during actual implementation. For example, a plurality of units or components can be combined, or can be integrated into another system, or some features can be omitted or not performed. In addition, the coupling, or direct coupling, or communication connection between the displayed or discussed components can be the indirect coupling or communication connection through some interfaces, units, or modules, and can be in electrical or other forms.

The units described as separate parts can or cannot be physically separate. Parts displayed as units can or cannot be physical units, and can be located in one position, or can be distributed on a plurality of network units. Some or all of the units can be selected according to actual requirements to achieve the objectives of the solutions in the embodiments.

In addition, functional units in the embodiments of the present disclosure can be integrated into one processing unit, or each of the units can exist alone physically, or two or more units are integrated into one unit. The foregoing integrated unit can be implemented in the form of hardware or can be implemented in the form of a software function unit.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A light box of an optical lens assembly for a near-eye display device, comprising:

a first layer facing a display screen of the near-eye display device; and
a second layer facing an optical element of the optical lens assembly,
wherein the light box is configured to receive a first light from a display screen of the near-eye display device, and transmit at least a portion of the first light to the optical element through a folded optical path to be converged to an eye;
the first layer and the second layer are flat;
the second layer of the light box comprises a plurality of reflective polarizers, a polarization selectivity of a first reflective polarizer in the reflective polarizers being different from a polarization selectivity of a second reflective polarizer in the reflective polarizers; and
the folded optical path includes a fold between the first layer and the second layer of the light box.

2. The light box according to claim 1, wherein the second layer of the light box further comprises a retarder placed in between the first reflective polarizer and the second reflective polarizer.

3. The light box according to claim 2, wherein:
the retarder in the second layer is a half-wave retarder.

4. The light box according to claim 1, wherein the polarization selectivity of the first reflective polarizer is orthogonal to the polarization selectivity of the second reflective polarizer.

5. The light box according to claim 1, wherein:
the first layer of the light box comprises a beam splitter facing the display screen and a first retarder facing the second layer.

6. The light box according to claim 5, wherein the beam splitter is a 50/50 beam splitter.

7. The light box according to claim 5, wherein the first retarder in the first layer is a quarter-wave retarder.

8. The light box according to claim 7, wherein:
the beam splitter is configured to receive the first light having a circular polarization of a first direction,
the first retarder is configured change a portion of the first light that passed through the beam splitter to a third light having a first linear polarization;
the second layer is configured to reflect the third light having the first linear polarization back to the first retarder; and
the first retarder is further configured to change the third light having the first linear polarization to a fourth light having the circular polarization of the first direction;
the beam splitter is further configured to reflect a portion of the fourth light to the first retarder, the reflected light having a circular polarization of a second direction;
the first retarder is further configured to change the reflected light to a fifth light having a second linear polarization, wherein the first linear polarization is orthogonal to the second linear polarization; and
the second layer is further configured to transmit at least a portion of the fifth light to the optical element as the second light having the second linear polarization.

9. An optical lens assembly for a near-eye display device, comprising:
a light box having a first layer facing a display screen of the near-eye display device and a second layer facing an optical element, the light box being configured to receive a first light from a display screen of the near-eye display device and transmit at least a portion of the first light to the optical element through a folded optical path, and the first layer and the second layer being flat; and the optical element aligned with an optical axis of an eye and configured to receive a second light from the light box and converge the second light to the eye,
wherein the second layer of the light box comprises a plurality of reflective polarizers, a polarization selectivity of a first reflective polarizer in the reflective polarizers being different from a polarization selectivity of a second reflective polarizer in the reflective polarizers; and
the folded optical path includes a fold between the first layer and the second layer of the light box.

10. The optical lens assembly according to claim 9, wherein the second layer of the light box further comprises a retarder placed in between the first reflective polarizer and the second reflective polarizer.

11. The optical lens assembly according to claim 10, wherein:
the retarder in the second layer is a half-wave retarder.

12. The optical lens assembly according to claim 9, wherein the polarization selectivity of the first reflective polarizer is orthogonal to the polarization selectivity of the second reflective polarizer.

13. The optical lens assembly according to claim 9, wherein a surface of the optical element facing the light box is curved.

14. The optical lens assembly according to claim 9, wherein:
the first layer of the light box comprises a beam splitter facing the display screen and a first retarder facing the second layer.

15. The optical lens assembly according to claim 14, wherein the beam splitter is a 50/50 beam splitter.

16. The optical lens assembly according to claim 14, wherein the first retarder is a quarter-wave retarder.

17. The optical lens assembly according to claim 16, wherein:
the display screen is configured to emit the first light having a circular polarization of a first direction;
the first retarder is configured change a portion of the first light that passed through the beam splitter to a third light having a first linear polarization;
the second layer is configured to reflect the third light having the first linear polarization back to the first retarder; and
the first retarder is further configured to change the third light having the first linear polarization to a fourth light having the circular polarization of the first direction;
the beam splitter is further configured to reflect a portion of the fourth light to the first retarder, the reflected light having a circular polarization of a second direction;
the first retarder is further configured to change the reflected light to a fifth light having a second linear polarization, wherein the first linear polarization is orthogonal to the second linear polarization; and
the second layer is further configured to transmit at least a portion of the fifth light to the optical element as the second light having the second linear polarization.

18. The optical lens assembly according to claim 9, wherein the optical element is a diffractive optical element (DOE).

19. The optical lens assembly according to claim 18, wherein the DOE comprises at least one of an injection molded DOE, a hologram film, or a Fresnel lens surface.

20. The optical lens assembly according to claim 18, wherein the DOE does not fold the optical path of the second light.

* * * * *